(12) United States Patent
Stanojkovski

(10) Patent No.: US 12,344,221 B2
(45) Date of Patent: Jul. 1, 2025

(54) METHOD FOR REDUCING PRESSURE PEAKS IN HYDRAULIC BRAKING SYSTEMS AND BRAKING SYSTEM THEREFOR

(71) Applicant: Continental Automotive Technologies GmbH, Hannover (DE)

(72) Inventor: Aleksandar Stanojkovski, Kleinostheim (DE)

(73) Assignee: Continental Automotive Technologies GmbH, Hannover (DE)

( * ) Notice: Subject to any disclaimer, the term of this patent is extended or adjusted under 35 U.S.C. 154(b) by 125 days.

(21) Appl. No.: 18/557,317

(22) PCT Filed: Mar. 31, 2022

(86) PCT No.: PCT/DE2022/200058
§ 371 (c)(1),
(2) Date: Oct. 26, 2023

(87) PCT Pub. No.: WO2022/228622
PCT Pub. Date: Nov. 3, 2022

(65) Prior Publication Data
US 2024/0208474 A1    Jun. 27, 2024

(30) Foreign Application Priority Data
Apr. 26, 2021  (DE) ............... 10 2021 204 111.6

(51) Int. Cl.
*B60T 8/40* (2006.01)
*B60T 13/66* (2006.01)
*B60T 13/74* (2006.01)

(52) U.S. Cl.
CPC .......... *B60T 8/4068* (2013.01); *B60T 13/662* (2013.01); *B60T 13/745* (2013.01)

(58) Field of Classification Search
CPC ....... B60T 8/4068; B60T 13/745; B60T 7/042
See application file for complete search history.

(56) References Cited

U.S. PATENT DOCUMENTS

2018/0370355 A1*  12/2018  Benevelli ............ F16H 61/4061
2019/0031025 A1*  1/2019   Benevelli ............ F16H 61/4061
(Continued)

FOREIGN PATENT DOCUMENTS

DE   102016203735 A1   9/2017
DE   102018220901 A1   6/2019
(Continued)

OTHER PUBLICATIONS

German Search Report dated Jan. 14, 2022 for the priority German Patent Application No. 10 2021 204 111.6.
(Continued)

*Primary Examiner* — Long T Tran

(57) ABSTRACT

A method for reducing pressure peaks in hydraulic brake systems comprises an electrically operated pressurization device. A drive resistance variable of the pressurization device is measured, for example the torque. A speed variable of the pressurization device is measured. A quotient of the drive resistance variable and the speed variable is calculated. The quotient is monitored for the occurrence of a jump and, in the case of a determined jump, a speed requirement of the pressurization device is reduced and/or a hydraulic valve for pressure dissipation is actuated.

21 Claims, 3 Drawing Sheets

(56) References Cited

U.S. PATENT DOCUMENTS

| | | | | |
|---|---|---|---|---|
| 2019/0366996 A1* | 12/2019 | Emde | .................. | B60T 13/20 |
| 2019/0366999 A1* | 12/2019 | Emde | .................. | B60T 8/00 |
| 2020/0039492 A1 | 2/2020 | Foitzik | | |
| 2021/0300186 A1* | 9/2021 | Heller | .................. | B60L 7/26 |
| 2022/0250600 A1* | 8/2022 | Leiber | .................. | B60T 8/94 |

FOREIGN PATENT DOCUMENTS

| | | |
|---|---|---|
| DE | 102018213069 A1 | 2/2020 |
| JP | H0554138 U | 7/1993 |
| KR | 100417314 B1 | 3/2004 |
| KR | 20130114111 A | 10/2013 |
| KR | 20200015388 A | 2/2020 |

OTHER PUBLICATIONS

The International Search Report and the Written Opinion of the International Searching Authority mailed on Jul. 12, 2022 for the PCT Application No. PCT/DE2022/200058 which this application claims priority.
Notice of Refusal dated Oct. 2, 2024 for the counterpart Japanese Patent Application No. 2023-558448 and translation of same.
Notice of Rejection dated Dec. 14, 2024 for the counterpart Korean Patent Application No. 10-2023-7033038 and translation of same.
Notice of Allowance dated Dec. 24, 2024 for the counterpart Japanese Patent Application No. 2023-558448 and translation of same.

* cited by examiner

METHOD FOR REDUCING PRESSURE PEAKS IN HYDRAULIC BRAKING SYSTEMS AND BRAKING SYSTEM THEREFOR

TECHNICAL FIELD

The invention relates to a method for reducing pressure peaks in hydraulic brake systems comprising an electrically operated pressurization device.

BACKGROUND

In modern brake systems, in the case of driver-independent brake interventions, a pressure actuation in the hydraulic system of the brake system is brought about by way of the electrically operated pressurization device. In the case of what are known as brake-by-wire brake systems, a pressure actuation is brought about by the electrically operated pressurization device even in the case of brake interventions which are triggered by way of the driver. In many operating states, the pressurization device operates at least briefly against closed valves and therefore against a system with very high rigidity. This is the case, for example, if, in the case of an active volume delivery of the pressurization device, the inlet valves of the wheel brakes close suddenly. As a result, pressure peaks at the level of several hundred bar can arise within a few milliseconds as a result of the mass moment of inertia of the pressurization device, which pressure peaks have a negative effect on the service life of the hydraulic components.

In order to avoid pressure peaks of this type, it is known for data of a system pressure sensor to be evaluated and an intervention to be carried out in the wheel pressure regulation in the case of the occurrence of excessively high pressures. Since brake systems typically have to have high redundancy, in order for it to be possible for reliable braking of the vehicle to be ensured even in the case of failure of part systems, they often utilize a multiplicity of control units which communicate with one another via an interface. Since communication of this type is associated with a great time delay, however, the regulation operations occur in part too late to reliably prevent the occurrence of the pressure peaks.

SUMMARY

It is therefore desirable to specify a method, by way of which the occurrence of pressure peaks can be prevented even in highly redundant brake systems.

A method for reducing pressure peaks in hydraulic brake systems comprises an electrically operated pressurization device. A drive resistance variable of the pressurization device is measured, for example torque. A speed variable of the pressurization device is measured. A quotient is calculated from these two measured values, the drive resistance variable and the speed variable. It has been shown that the two measured values lose validity in opposite directions in the case of the occurrence of a jump, the effect being superelevated by way of the quotient formation. If the quotient which is determined in this way is then monitored for the occurrence of a jump, the latter is clearly shown at an early stage. In the case of a determined jump, a speed requirement of the pressurization device is then reduced and/or a hydraulic valve for pressure dissipation is actuated. As a result, the pressure peak is already suppressed at the beginning.

In one embodiment, the pressurization device is configured as a linear actuator. This is a pressure provision device which can be connected hydraulically to the wheel brakes and has a pressure piston which can be moved into a pressure chamber with the aid of a motor in order to provide a system pressure for the active build-up of pressure in the wheel brakes. Here, the motor is typically connected to the piston via a rotational/translational gear mechanism. As speed variable, the rotational speed of the motor can be measured. For example, a rotor position sensor of the pressurization device can be utilized to this end. The exerted torque can be determined, for example, from the power consumption of the motor or else can be measured by way of a sensor which is provided for this purpose.

In a further embodiment, a jump is detected if the absolute value of the calculated quotient exceeds a first threshold value. An evaluation of this type can be implemented, for example, in the case of relatively imprecise measurements or in the case of noisy measurements.

In one embodiment, the first threshold value lies between 1 mNm/rpm and 2 mNm/rpm, preferably at 1.5 mNm/rpm. Here, the speed variable has been selected as rotational speed and has been measured in revolutions per minute (rpm). The torque is specified in milli Newton meters mNm.

In a further embodiment, a temporal profile of the quotient is stored, a jump being detected if the gradient of the calculated quotient in the stored profile exceeds a second threshold value. The monitoring of the gradient can be used as an alternative or in addition to the monitoring of the absolute value. The calculated quotient may also be smoothed. To this end, for example, temporal averaging can be carried out.

In one embodiment, the second threshold value lies between 0.1 Nm/rpm*sec and 0.3 Nm/rpm*sec, for example at 0.15 Nm/rpm*sec.

In a further embodiment, a temporal profile of the quotient is stored, a jump being detected if the curvature of the calculated quotient in the stored profile exceeds a third threshold value. Accordingly, the second derivative with respect to the time of the quotient is formed and monitored. Monitoring of this type can detect a jump and therefore a pressure peak to be reliably expected at an early stage for example in the case of accurate, well smoothed measured values.

In a further embodiment, the hydraulic valve is actuated in such a way that it opens at least partially. In this way, hydraulic volume or brake fluid can flow away through the hydraulic valve, as a result of which the pressure peak is minimized.

In a further embodiment, the actuation of the hydraulic valve is carried out by the same control unit which also regulates the pressurization device. For example, a system pressure sensor of the brake system is arranged on a different control unit and not on the same control unit as the controller of the hydraulic valve and the pressurization device. In this way, latency times as a result of communication between different control units are avoided, and the monitoring can react rapidly.

In a further embodiment, the hydraulic valve is arranged between the pressurization device and a pressure-free brake fluid reservoir or pressure medium storage vessel. For example, the hydraulic valve is arranged directly between these components. In this way, a rapid pressure dissipation is possible as soon as an arising pressure peak has been detected.

In a further embodiment, the hydraulic valve comprises at least one inlet valve of a wheel brake of the brake system.

Here, the inlet valve is not simply opened, but rather the control current of the inlet valve is reduced. Inlet valves are normally open valves for reasons of redundancy. That is to say, the inlet valves are supplied with an electric current for closing and for holding in the closed position. The pressure difference from a high pressure at the side which faces the pressurization device to the low pressure on the side which faces the wheel brake attempts to press the valve open. The closing current counteracts this force and holds the valve in the closed position. Depending on the electric closing current which is set, however, there is a hydraulic pressure, from which the inlet valve no longer holds in a sealed manner and hydraulic volume can pass. The closing current of the inlet valve is then reduced: for example to a value which still holds the hydraulic valve closed in normal operation, but allows hydraulic volume to pass at pressure values which correspond to a pressure peak (e.g. 100 to 300 bar).

Moreover, the object is achieved by way of a brake system for a motor vehicle which is configured to carry out one of the above methods.

Further features, advantages and possible applications of the embodiments also result from the following description of exemplary embodiments and the drawings. All of the features described and/or pictorially depicted belong to the subject matter of the embodiments both individually and in any combination, also independently of their summarization in the claims or the back-references thereof.

DETAILED DESCRIPTION

Figure 1:
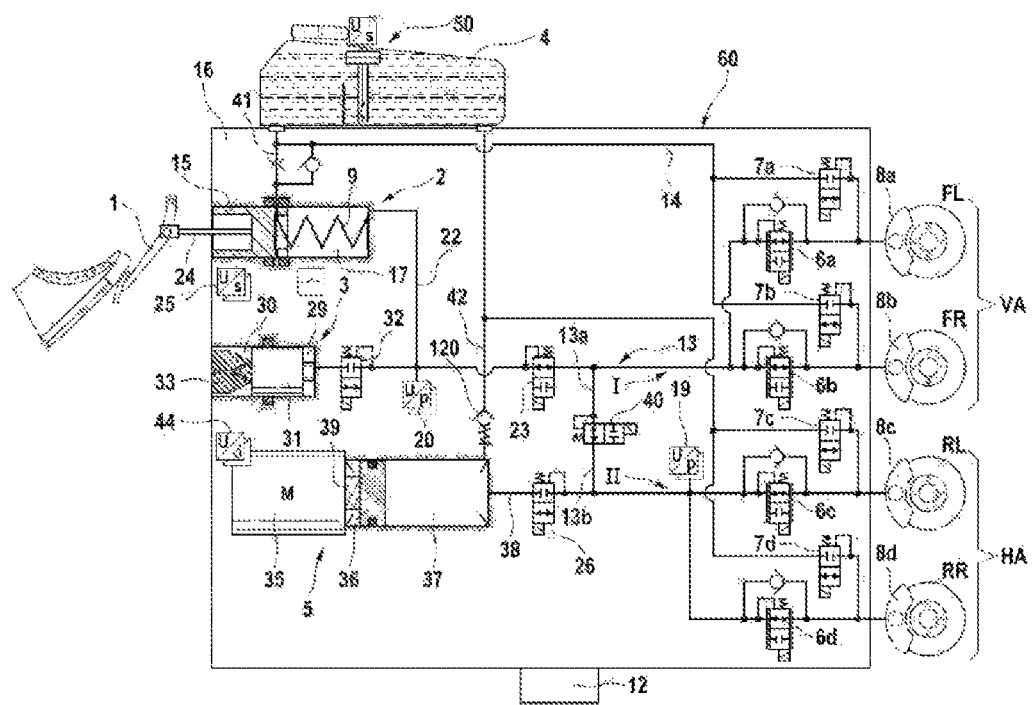
FIG. 1 diagrammatically shows a brake system of a first embodiment.

A brake system for a motor vehicle shown in FIG. 1 comprises four hydraulically actuable wheel brakes 8a-8d. The brake system comprises a brake master cylinder 2 which can be actuated by means of an actuating or brake pedal 1, A travel simulator or a simulation device 3 which interacts with the brake master cylinder 2, a pressure medium storage vessel 4 under atmospheric pressure, an electrically controllable pressurization device 5, and wheel-individual brake pressure modulation valves which are configured according to the example as inlet valves 6a-6d and outlet valves 7a-7d. Furthermore, the brake system comprises an electronic control and regulating system 12 which comprises a plurality of control units, for actuating the electrically actuable components of the brake system.

According to the example, the wheel brake 8a is assigned to the left front wheel (FL), the wheel brake 8b is assigned to the right front wheel (FR), the wheel brake 8c is assigned to the left rear wheel (RL), and the wheel brake 8d is assigned to the right rear wheel (RR).

The master brake cylinder 2 has, in a housing 16, a brake master cylinder piston 15, which delimits a hydraulic pressure chamber 17, and constitutes a single-circuit brake master cylinder. The pressure chamber 17 receives a restoring spring 9 which, with the brake master cylinder 2 unactuated, positions the piston 15 in a starting position.

The pressure chamber 17 is connected firstly via radial bores configured in the piston 15 and a corresponding pressure equalization line 41 to the pressure medium storage vessel 4, wherein they can be shut off by way of a relative movement of the piston 17 in the housing 16. Secondly, the pressure chamber 17 is connected by means of a hydraulic line section (also referred to as first feed line) 22 to a brake supply line 13 to which the inlet ports of the inlet valves 6a-6d are connected. The pressure chamber 17 of the brake master cylinder 2 is thus connected to all the inlet valves 6a-6d.

In the present embodiment, no valve, in particular no electrically or hydraulically actuable valve and no check valve, is arranged in the pressure equalization line 41 or in the connection between the pressure chamber 17 and the pressure medium storage vessel 4.

As an alternative, a diagnosis valve (in particular, normally open) can be contained in the pressure equalization line 41 or between the brake master cylinder 2 and the pressure medium storage vessel 4, preferably a parallel connection of a normally open diagnosis valve with a check valve which closes toward the pressure medium storage vessel 4.

An isolating valve 23 is arranged between the feed line 22 connected to the pressure chamber 17 and the brake supply line 13, or the pressure chamber 17 is connected to the brake supply line 13 via the first feed line 22 having an isolating valve 23. The isolating valve 23 is configured as an electrically actuable, for example normally open, 2/2-way valve. The isolating valve 23 allows the hydraulic connection between the pressure chamber 17 and the brake supply line 13 to be shut off.

A piston rod 24 couples the pivoting movement of the brake pedal 1 as a consequence of a pedal actuation to the translational movement of the brake master cylinder piston 15, the actuation travel of which is detected by a displacement sensor 25 which may be of redundant configuration. As a result, the corresponding piston travel signal is a measure of the brake pedal actuation angle. It represents a braking demand of a vehicle driver.

A pressure sensor 20 connected to the first feed line 22 detects the pressure built up in the pressure chamber 17 as a result of a displacement of the piston 15. This pressure value can likewise be evaluated to characterize or determine the braking demand of the vehicle driver. As an alternative to a pressure sensor 20, use can also be made of a force sensor 20 for determining the braking demand of the vehicle driver.

According to the example, the simulation device 3 is of hydraulic configuration and is coupled hydraulically to the brake master cylinder 2. The simulation device 3 has, for example, substantially a simulator chamber 29, a simulator rear chamber 30 and a simulator piston 31 which disconnects the two chambers 29, 30 from one another. The simulator piston 31 is supported on a housing by way of an elastic element 33 (for example, a simulator spring) which is arranged in the simulator rear chamber 30 (which is dry according to the example). According to the example, the hydraulic simulator chamber 29 is connected to the pressure chamber 17 of the master brake cylinder 2 by means of an electrically actuable valve, for example normally closed simulator enable valve 32.

Per hydraulically actuable wheel brake 8a-8d, the braking system or the brake system comprises an inlet valve 6a-6d and an outlet valve 7a-7d which are connected together hydraulically in pairs via central ports and are connected to the wheel brake 8a-8d. A check valve (not denoted in greater detail) which opens toward the brake supply line 13 is connected in parallel in each case to the inlet valves 6a-6d. The outlet ports of the outlet valves 7a-7d are connected to the pressure medium storage vessel 4 via a common return line 14.

The electrically controllable pressure provision device 5 is configured as a hydraulic cylinder/piston arrangement (or a single-circuit, electrohydraulic actuator (linear actuator)), the piston 36 of which can be actuated by a diagrammatically indicated electric motor 35 with a likewise diagrammatically illustrated rotational/translational gear mechanism 39 connected in between. The piston 36 delimits the single pressure space 37 of the pressure provision device 5. A merely diagrammatically indicated rotor position sensor which serves to detect the rotor position of the electric motor 35 is denoted by reference sign 44. This can be used to evaluate the current rotational speed.

A line section (also called a second feed line) 38 is connected to the pressure space 37 of the electrically controllable pressurization device 5. The feed line 38 is connected to the brake supply line 13 via an electrically actuable, preferably normally closed sequence valve 26. The sequence valve 26 allows the hydraulic connection between the pressure space 37 of the electrically controllable pressure provision device 5 and the brake supply line 13 (and thus the inlet ports of the inlet valves 6a-6d) to be opened and shut off in a controlled manner.

The actuator pressure produced by the action of force of the piston 36 on the pressure medium enclosed in the pressure space 37 is fed into the second feed line 38. In a "brake-by-wire" operating type, for example in a fault-free state of the brake system, the feed line 38 is connected to the brake supply line 13 via the sequence valve 26. In this way there occurs, during normal braking, a wheel brake pressure build-up and pressure dissipation for all the wheel brakes 8a-8d as a result of the forward and backward movement of the piston 36.

In the case of a pressure dissipation by backward movement of the piston 36, the pressure medium previously displaced from the pressure space 37 of the pressure provision device 5 into the wheel brakes 8a-8d flows back again into the pressure space 37 in the same way.

As an alternative, different wheel brake pressures can be set simply in a wheel-individual manner by means of the inlet and outlet valves 6a-6d, 7a-7d. In the case of a corresponding pressure dissipation, the pressure medium fraction discharged via the outlet valves 7a-7d flows via the return line 14 into the pressure medium storage vessel 4.

Replenishing of pressure medium into the pressure space 37 is possible by way of a retraction of the piston 36 in the case of a closed sequence valve 26, by it being possible for pressure medium to flow out of the vessel 4 via the line 42 with a check valve 53 opening in the flow direction to the actuator 5 into the actuator pressure space or pressure space 37. According to the example, the pressure space 37 is additionally connected, in an unactuated state of the piston 36, to the pressure medium storage vessel 4 via one or more snifting holes. This connection between the pressure space 37 and pressure medium storage vessel 4 is disconnected upon a (sufficient) actuation of the piston 36 in the actuating direction 27.

In the brake supply line 13 there is arranged an electrically actuable, normally open circuit isolating valve 40 by means of which the brake supply line 13 can be separated into a first line section 13a, which is connected (via the isolating valve 23) to the brake master cylinder 2, and a second line section 13b, which is connected (via the sequence valve 26) to the pressure provision device 5. The first line section 13a is connected to the inlet valves 6a, 6b of the wheel brakes 8a, 8b, and the second line section 13b is connected to the inlet valves 6c, 6d of the wheel brakes 8c, 8d.

With the circuit isolating valve 40 opened, the brake system is of single-circuit design. By closing the circuit isolating valve 40, the brake system, in particular controlled in a situation-appropriate manner, can be divided or split up into two brake circuits I and II. Here, in the first brake circuit I, the brake master cylinder 2 is connected (via the isolating valve 23) to only the inlet valves 6a, 6b of the wheel brakes 8a, 8b of the front axle VA, and, in the second brake circuit II, the pressure provision device 5 is connected (with the sequence valve 26 opened) to only the wheel brakes 8c and 8d of the rear axle HA.

The inlet ports of all the inlet valves 6a-6d can be supplied by means of the pressure supply line 13, in the case of an open circuit isolating valve 40, with a pressure which, in a first operating type (for example, "brake-by-wire" operating type), corresponds to the brake pressure which is provided by the pressure provision device 5. In a second operating type (for example, in a currentless fallback operating type), the brake supply line 13 can be loaded with the pressure of the pressure chamber 17 of the brake master cylinder 2.

The brake system has a level measuring device 50 for determining a pressure medium level in the pressure medium storage vessel 4. A situation recognition for circuit separation by means of the circuit isolating valve 40 occurs via the level measuring device 50.

According to the example, the hydraulic components, namely the brake master cylinder 2, the simulation device 3, the pressure provision device 5, the valves 6a-6d, 7a-7d, 23, 26, 40 and 32 and the hydraulic connections including the brake supply line 13, are arranged together in a (single) hydraulic control and regulating unit 60 (HCU). The hydraulic control and regulating unit 60 is assigned the electronic control and regulating system (ECU) 12 which has a plurality of control units. The hydraulic and electronic control and regulating units 60, 12 may be configured as one unit (HECU).

The brake system comprises a pressure sensor 19 or system pressure sensor for detecting the pressure which is provided by the pressure provision device 5. Here, the pressure sensor 19 is arranged downstream of the sequence valve 26, as viewed from the pressure chamber 37 of the pressure provision device 5.

Figure 2:
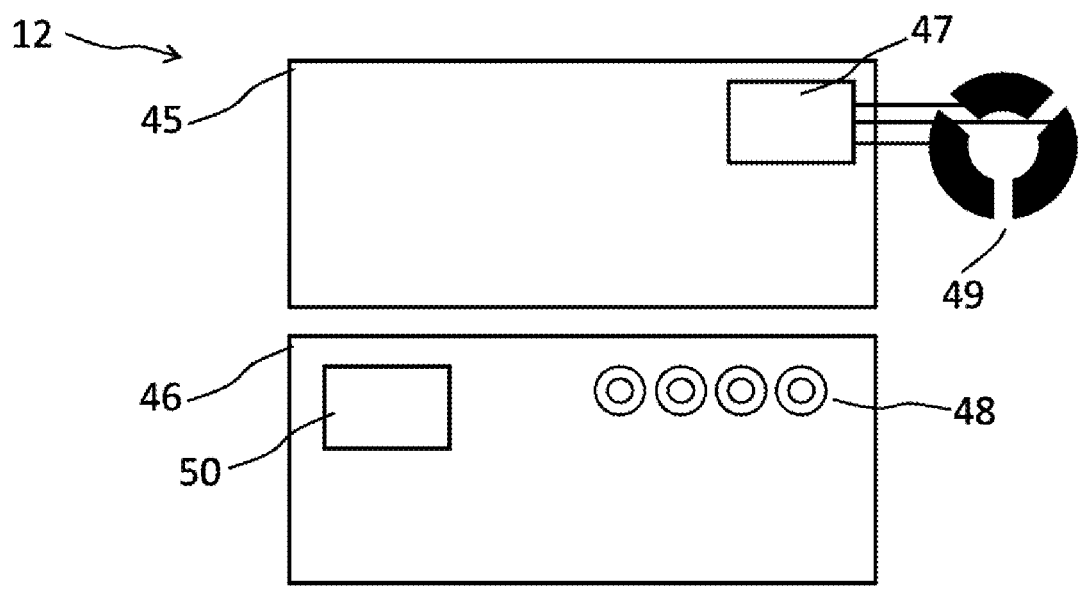
FIG. 2 diagrammatically shows the electronic architecture of the brake system from FIG. 1.

FIG. 2 shows the control system 12 of the brake system from FIG. 1. It comprises two separate control units 45, 46 which are each designed to control and regulate a part region of the brake system. As the controller which gives it its name here, the motor control unit comprises the motor controller 47 which regulates the motor 49 of the pressurization device. In addition to the valve controller 48 which gives it its name, the valve control device 46 comprises the electronics for reading out the system pressure sensor 50. The two control units can communicate with one another via an interface. If a regulation operation which is reliant on the data of the pressure sensor 50 were carried out to avoid pressure peaks, communication would have to be carried out between the two control units 46 and 47, in order to carry out an intervention in the motor controller 47. Communication of this type leads to a delay, as a result of which a pressure peak cannot be prevented rapidly enough. The method can then be carried out only on the motor control unit 45.

Figure 3:
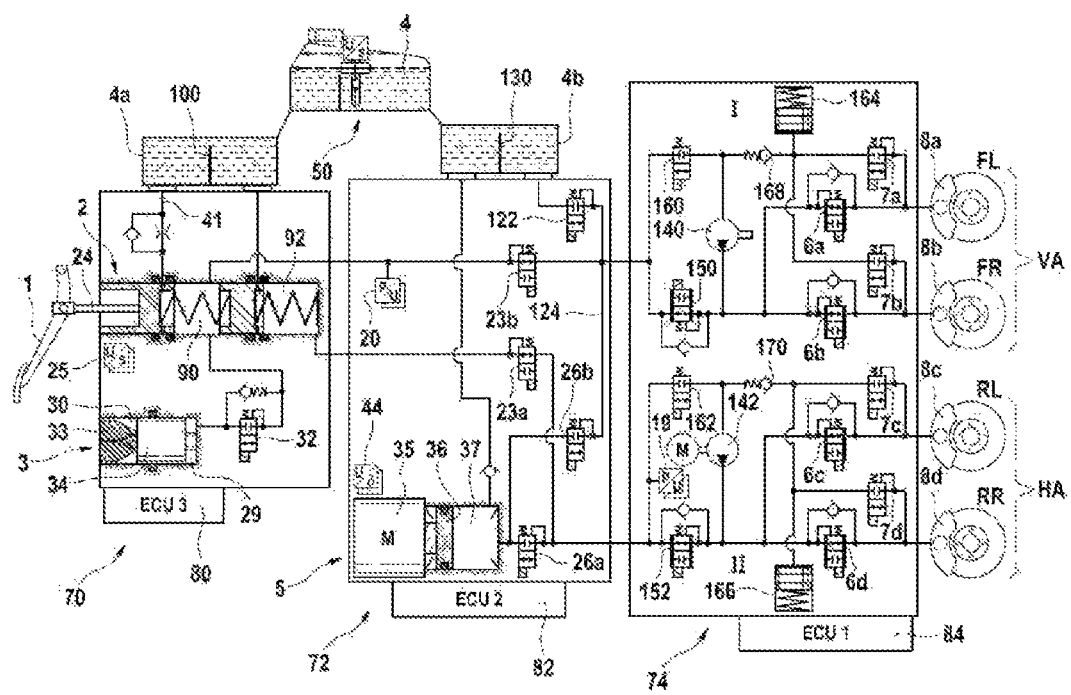
FIG. 3 diagrammatically shows a brake system according to the invention of a second embodiment.

FIG. 3 shows a brake system in a further embodiment. The brake system comprises three modules 70, 72, 74 which each comprise a separate control and regulating unit 80, 82, 84. The module 70 comprises the brake master cylinder 2 which is configured as a tandem brake master cylinder with a primary chamber 90 and a secondary chamber 92, and the simulator or the simulation device 3. With the aid of the simulator enable valve 32, the primary chamber 90 can be connected to the simulator chamber 29 in the by-wire mode. The two chambers 90, 92 of the brake master cylinder can be connected hydraulically to a pressure medium storage vessel 4a. A dividing wall 100 in this vessel ensures that pressure medium is still available for the other brake circuit even in the case of a leak of one of the two brake circuits I, II connected in each case to a chamber 90, 92. The control and regulating unit 80 of the module 80 serves substantially to control the valve 32.

The brake system has a driver brake request detection means which comprises a pedal travel sensor 25 and a pressure sensor 20 for measuring the pressure in the brake master cylinder. The second module 72 with the control and regulating unit 82 comprises the pressure provision device 5 and two sequence valves 26a, 26b, by way of which the pressure space 37 of the pressure provision device 5 can be connected hydraulically to the wheel brakes. Furthermore, it comprises the one rotor position sensor 44 and a pressure sensor 20 for measuring the pressure in the primary chamber 90. The two chambers 90, 92 can be disconnected hydraulically from the wheel brakes with the aid of isolating valves 23a, 23b in the brake-by-wire mode, with the result that, in the case of an open simulator enable valve 22, the driver displaces brake fluid out of the primary chamber 90 into the simulator chamber 29.

The pressure chamber 37 is connected hydraulically to a pressure medium storage vessel 4b, and can replenish brake medium from the latter, wherein the return flow of pressure medium from the pressure chamber 37 into the vessel 4b is prevented by way of a check valve 120.

If the isolating valves 23a, 23b are closed and disconnect the brake master cylinder 2 hydraulically from the wheel brakes 8a-d during the by-wire operation, excess brake volume can be conveyed via a line 124 and opening of a discharge valve 122 into the vessel 4b.

An intermediate wall 130 is provided in the pressure medium storage vessel 4b, which intermediate wall 130 defines two separate chambers when the filling level drops below the height of the intermediate wall 130. The control and regulating unit 82 serves to actuate the pressure provision device 5 and the valves 26a, 26b, 23a, 23b, 122.

The third module 74 with the control and regulating unit 84 comprises the inlet valves 6a-d and outlet valves 7a-d which are assigned to the wheel brakes. A pump 140, 142 which can be connected hydraulically in each case via a pump sequence valve 160, 162 in the suction path to the pressure provision device is provided in each case in each brake circuit.

The pressure which can be built up with the aid of the respective pump 140, 142 can be set in each case with the aid of overflow valves 150, 153. If the pump 140, 142 delivers too much volume and the pressure rises, this valve 150, 152 is pressed open, and the pressure in the pump space remains capable of being regulated by way of this valve 150, 152 and its flow.

Furthermore, a low pressure accumulator 164, 166 is provided in each case in each of the two brake circuits. Flow of pressure medium out of the delivery circuit of the pump 140, 142 in the direction of the outlet valves 7a-d is prevented in each case with the aid of a check valve 168, 170. The control and regulating unit 84 serves to actuate the pumps 140, 142 and the valves 67a-d, 7a-d, 160, 162, 150, 152. Furthermore, the module 74 comprises the system pressure sensor 19.

The two pressure medium storage vessels 4a, 4b are connected hydraulically to the common pressure medium storage vessel 4.

In this brake system, the pressure provision device 5 serves to provide a system pressure, while the pumps 140, 142 are used, for example, for regulating operations and assist the pressure build-up by way of the pressure provision device 5.

The three control and regulating units 80, 82, 84 are connected to one another on the signal side, for example via a CAN bus.

The method can then be implemented on the second control unit 82. This regulates the linear actuator 5 and therefore comprises, for example, the data of the rotor position sensor 44. If the ECU 2 82 determines a jump in the quotient from the torque and rotational speed, it can, for example, open the discharge valve 122 which is controlled on the same printed circuit board. Therefore, the occurrence of a pressure peak is reacted to rapidly.

Figure 4:
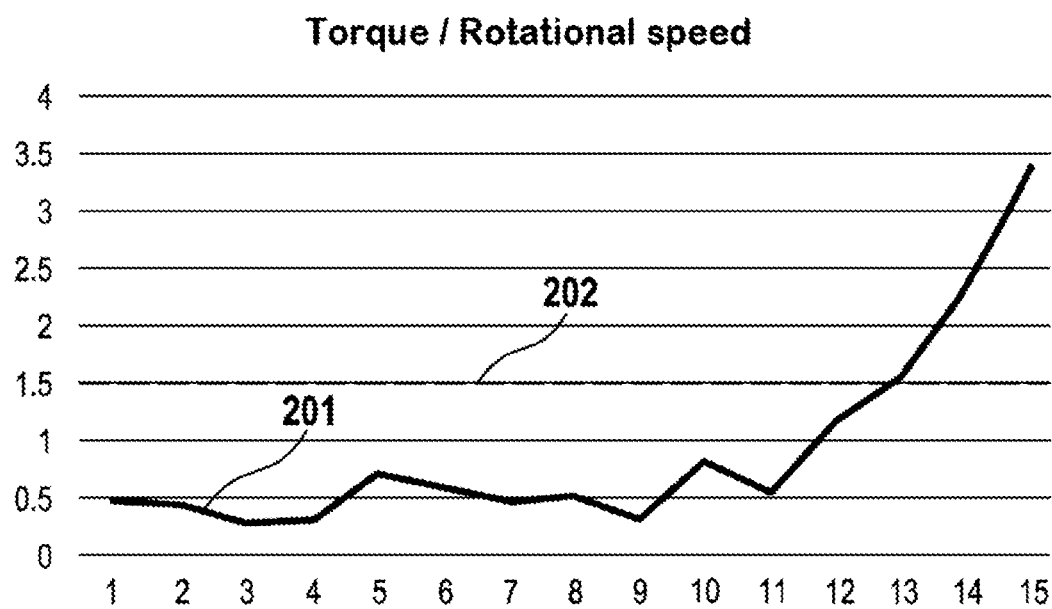
FIG. 4 shows an exemplary measurement of the quotient according to the invention.

FIG. 4 shows by way of example the quotient from a measured torque and the rotational speed of a linear actuator. In normal operation (front range of the measurement), the value of the quotient fluctuates by approximately 0.5 mNm/rpm. As soon as the inlet valves are suddenly closed, the value of the quotient also rises steeply and exceeds the first threshold value at 1.5 mNm/rpm. The system then assumes a pressure peak and initiates corresponding countermeasures.

Figure 5:
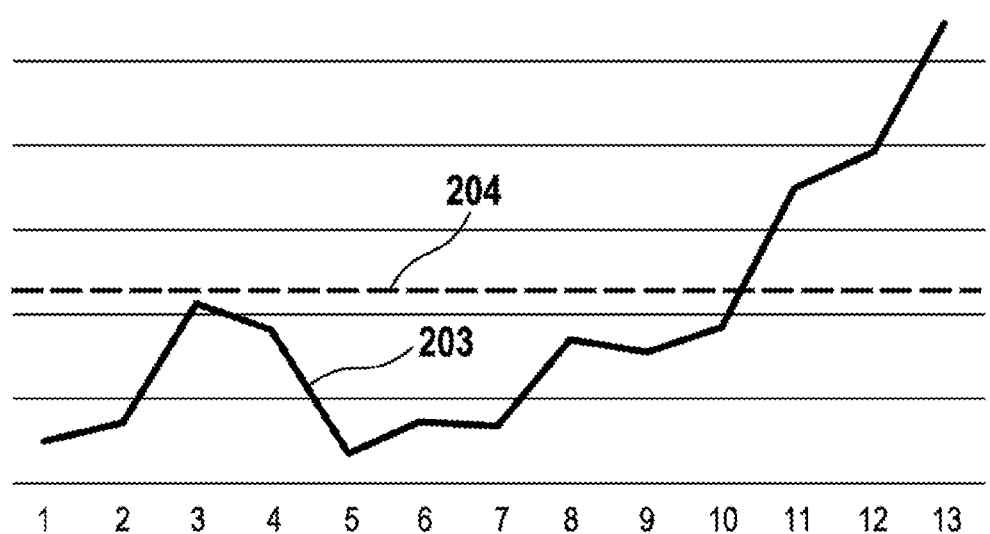
FIG. 5 shows the averaged derivation of the exemplary measurement from FIG. 4.

FIG. 5 shows the evaluation of the gradient 203 of the quotient. The data are calculated by derivation of the quotient from FIG. 4 and are time-averaged. In normal operation, the values fluctuate below the second threshold value 204. As soon as the inlet valves are closed, the gradient increases rapidly and exceeds the second threshold value 204, and corresponding countermeasures are initiated.

Therefore, the method ensures reliable avoidance of pressure peaks even in the case of redundant brake systems which divide the controller among a plurality of control units and can therefore extend the service life of the hydraulic components.

The invention claimed is:

1. A method for reducing pressure peaks in hydraulic brake systems comprising:
   measuring a drive resistance variable of an electronically operate pressurization device;
   measuring a speed variable of the pressurization device;
   calculating a quotient of the drive resistance variable and the speed variable;
   monitoring the quotient for the occurrence of a jump; and
   wherein when a determined jump occurs at least one of reducing a speed requirement of the pressurization device and actuating a hydraulic valve for pressure dissipation.

2. The method as claimed in claim 1, wherein the pressurization device is a linear actuator.

3. The method as claimed in claim 1, wherein a jump is detected when an absolute value of the calculated quotient exceeds a first threshold value.

4. The method as claimed in claim 3, wherein the first threshold value lies between 1 mNm/rpm and 2 mNm/rpm.

5. The method as claimed in claim 1, further comprising storing a temporal profile of the quotient; and detecting a jump when a gradient of the calculated quotient in the stored profile exceeds a second threshold value.

6. The method as claimed in claim 5, wherein the second threshold value lies between 0.1 Nm/rpm*sec and 0.3 Nm/rpm*sec.

7. The method as claimed in claim 1, further comprising:
storing a temporal profile of the quotient; and
detecting a jump when a curvature of the calculated quotient in the stored profile exceeds a third threshold value.

8. The method as claimed claim 1, further comprising actuating the hydraulic valve in such that the hydraulic valve at least partially opens.

9. The method as claimed in claim 1, wherein the actuation of the hydraulic valve is carried out by the same control unit which also regulates the pressurization device.

10. The method as claimed in claim 1, wherein the hydraulic valve is arranged between the pressurization device and a pressure-free brake fluid reservoir.

11. The method as claimed in claim 1, further comprising reducing a control current of at least one inlet valve of the hydraulic valve of a wheel brake of the brake system.

12. A brake system for a motor vehicle comprising a control unit with instructions for:
measuring a drive resistance variable of an electronically operate pressurization device;
measuring a speed variable of the pressurization device;
calculating a quotient of the drive resistance variable and the speed variable;
monitoring the quotient for the occurrence of a jump; and
wherein when a determined jump occurs at least one of reducing a speed requirement of the pressurization device and actuating a hydraulic valve for pressure dissipation.

13. The brake system as claimed in claim 12, wherein the pressurization device is a linear actuator.

14. The brake system as claimed in claim 12, wherein a jump is detected when an absolute value of the calculated quotient exceeds a first threshold value.

15. The brake system as claimed in claim 12, further comprising instructions for storing a temporal profile of the quotient; and detecting a jump when a gradient of the calculated quotient in the stored profile exceeds a second threshold value.

16. The brake system as claimed in claim 12, further comprising instructions for storing a temporal profile of the quotient; and detecting a jump when a curvature of the calculated quotient in the stored profile exceeds a third threshold value.

17. The brake system as claimed in claim 12, further comprising instructions for actuating the hydraulic valve such that the hydraulic valve at least partially opens.

18. The brake system as claimed in claim 12, wherein the actuation of the hydraulic valve is carried out by the same control unit which also regulates the pressurization device.

19. The brake system as claimed in claim 12, wherein the hydraulic valve is arranged between the pressurization device and a pressure-free brake fluid reservoir.

20. The brake system as claimed in claim 12, further comprising instructions for reducing a control current of at least one inlet valve of the hydraulic valve of a wheel brake of the brake system.

21. The method as claimed in claim 12, wherein the drive resistance variable is a torque.

* * * * *